United States Patent
Broden et al.

(10) Patent No.: US 6,675,655 B2
(45) Date of Patent: Jan. 13, 2004

(54) PRESSURE TRANSMITTER WITH PROCESS COUPLING

(75) Inventors: David A. Broden, Andover, MN (US); Debra K. Zeller, Victoria, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 10/103,452

(22) Filed: Mar. 21, 2002

(65) Prior Publication Data

US 2003/0177837 A1 Sep. 25, 2003

(51) Int. Cl.[7] .............................................. G01L 15/00
(52) U.S. Cl. ........................ 73/716; 73/718; 73/756; 338/42; 361/283.1
(58) Field of Search .................. 73/716, 706, 718, 73/756; 137/112, 340, 356; 338/42, 92; 361/283.1–283.4

(56) References Cited

U.S. PATENT DOCUMENTS

| | | | |
|---|---|---|---|
| 4,109,535 A | 8/1978 | Reed et al. ................ 73/706 |
| 4,406,993 A | 9/1983 | Kurtz ....................... 338/42 |
| 4,420,015 A | 12/1983 | Blaser ...................... 137/852 |
| 4,658,618 A | 4/1987 | Hellgren .................... 72/63 |
| 4,833,922 A | 5/1989 | Frick et al. ................ 73/756 |
| 4,850,213 A | 7/1989 | Steinebrunner et al. ... 73/290 V |
| 5,094,109 A | 3/1992 | Dean et al. ................ 73/718 |
| 5,524,492 A | 6/1996 | Frick et al. ................ 73/706 |
| 5,668,322 A | 9/1997 | Broden ..................... 73/756 |
| 5,920,016 A | 7/1999 | Broden ..................... 73/756 |
| 5,922,965 A | 7/1999 | Behm et al. ................ 73/706 |
| 5,955,675 A | 9/1999 | Peterson ................... 73/706 |
| 6,055,863 A | 5/2000 | Behm et al. ................ 73/706 |
| 6,059,254 A | 5/2000 | Sundet et al. .............. 248/678 |

Primary Examiner—Edward Lefkowitz
Assistant Examiner—Marissa Ferguson
(74) Attorney, Agent, or Firm—Westman, Champlin & Kelly, P.A.

(57) ABSTRACT

A process transmitter for measuring a process pressure includes a pressure sensor in a sensor housing. An isolation diaphragm which isolates fill fluid from process fluid is spaced apart from a process fluid seal. The spacing reduces deformation of the isolation diaphragm due to a mounting force.

23 Claims, 6 Drawing Sheets

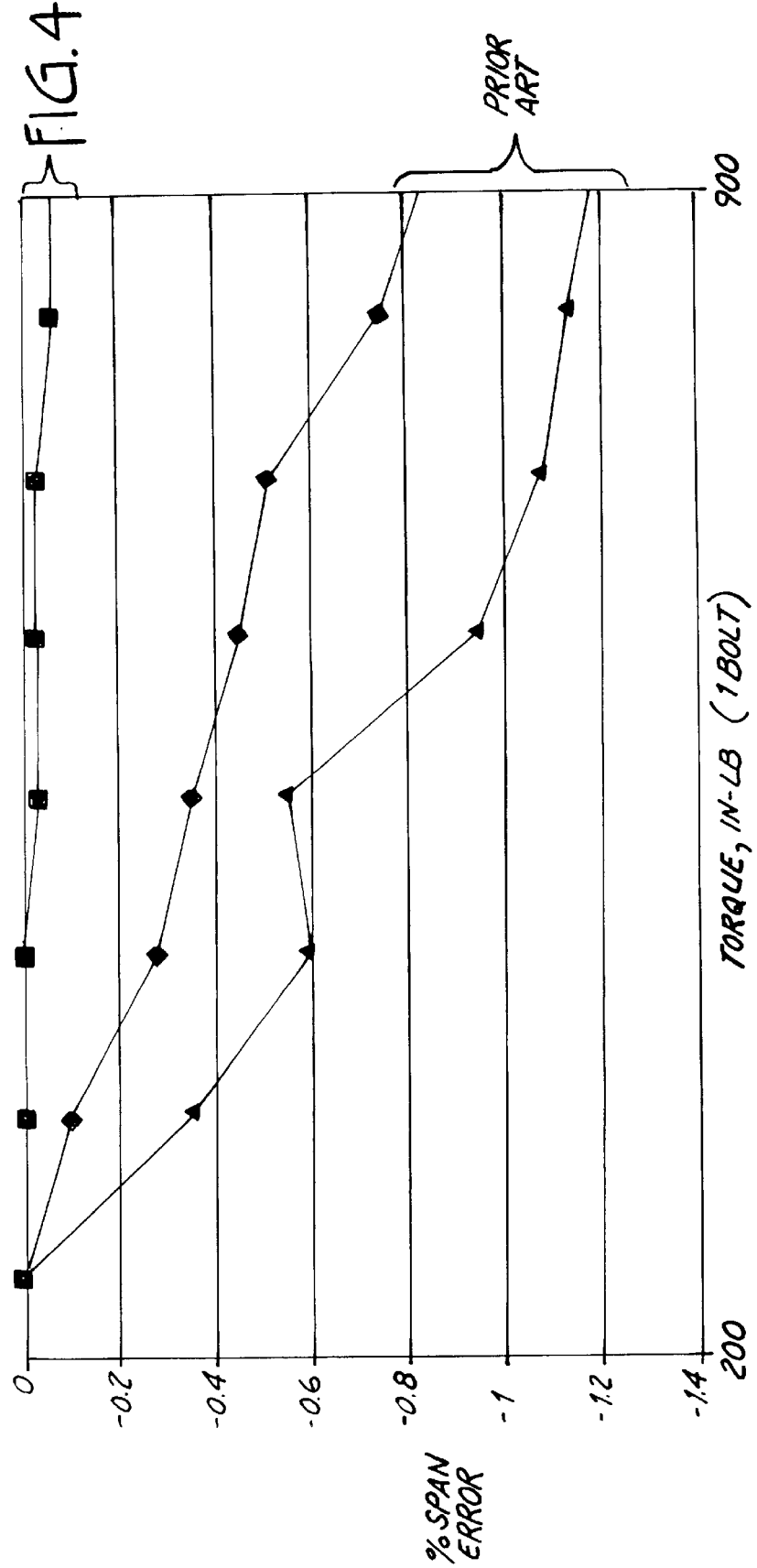

US 6,675,655 B2

PRESSURE TRANSMITTER WITH PROCESS COUPLING

BACKGROUND OF THE INVENTION

The present invention relates to process control instruments. More specifically, the present invention relates to the process coupling used to couple a pressure transmitter to process fluid.

Industrial processes such as oil refineries, chemical manufacturing plants, etc., use remote sensors known as "transmitters" to sense various process variables such as pressure, temperature, flow, etc. The sensed process variables are used to monitor and/or control operation of the process.

Transmitters which sense pressure of a process fluid use a pressure sensor which typically is coupled to at least one isolation diaphragm. The transmitters attach to a flange and include an opening which is aligned to receive process fluid from a passageway in the flange. The isolation diaphragm is positioned in the opening of the transmitter and isolates the pressure sensor from the process fluids being sensed. This prevents the sensor from being damaged or corroded by the process fluid. Pressure is transferred from the isolation diaphragm to the pressure sensor through a substantially incompressible isolation "fill fluid" which is carried in a capillary passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION are examples of pressure transmitters of this type.

Pressure transmitters frequently include a weld to secure the isolation diaphragm to the transmitter body. A weld ring can be used which is welded to the transmitter body and to the isolation diaphragm, thus securing the isolation diaphragm to the transmitter body. The weld ring can also be used to support a seal, such as an O-ring. When the transmitter is attached to the process flange by an attachment force, for example if the transmitter is bolted to the flange, the seal and weld ring are compressed against the flange to prevent process fluid from leaking past the opening.

The attachment force which compresses the weld ring against the flange tends to deform or deflect portions of the weld ring and transmitter body. Further, the attachment force causes stress in the isolation diaphragm which leads to deformation or deflection of the isolation diaphragm. When attempting to make highly accurate pressure measurements, this deformation or deflection of the isolation diaphragm can cause inaccuracies in the measured pressure.

SUMMARY OF THE INVENTION

A process transmitter for measuring a process pressure includes a pressure sensor in a sensor housing having a face configured to be exposed to process fluid. A fill fluid capillary tube couples fluid from the pressure sensor to the face of the sensor body. An isolation diaphragm isolates the fill fluid from the process fluid. A weld seals the isolation diaphragm to the face and a process fluid seal seals a process fluid connection to the face of the sensor housing to thereby couple process fluid to the isolation diaphragm. The process fluid seal is spaced apart from the weld to reduce stress on the isolation diaphragm from the process fluid seal.

BRIEF DESCRIPTION OF THE DRAWINGS

FIG. 5 is a graph of span error in percent versus torque in in·lb.

DETAILED DESCRIPTION OF THE PREFERRED EMBODIMENTS

Figure 1:
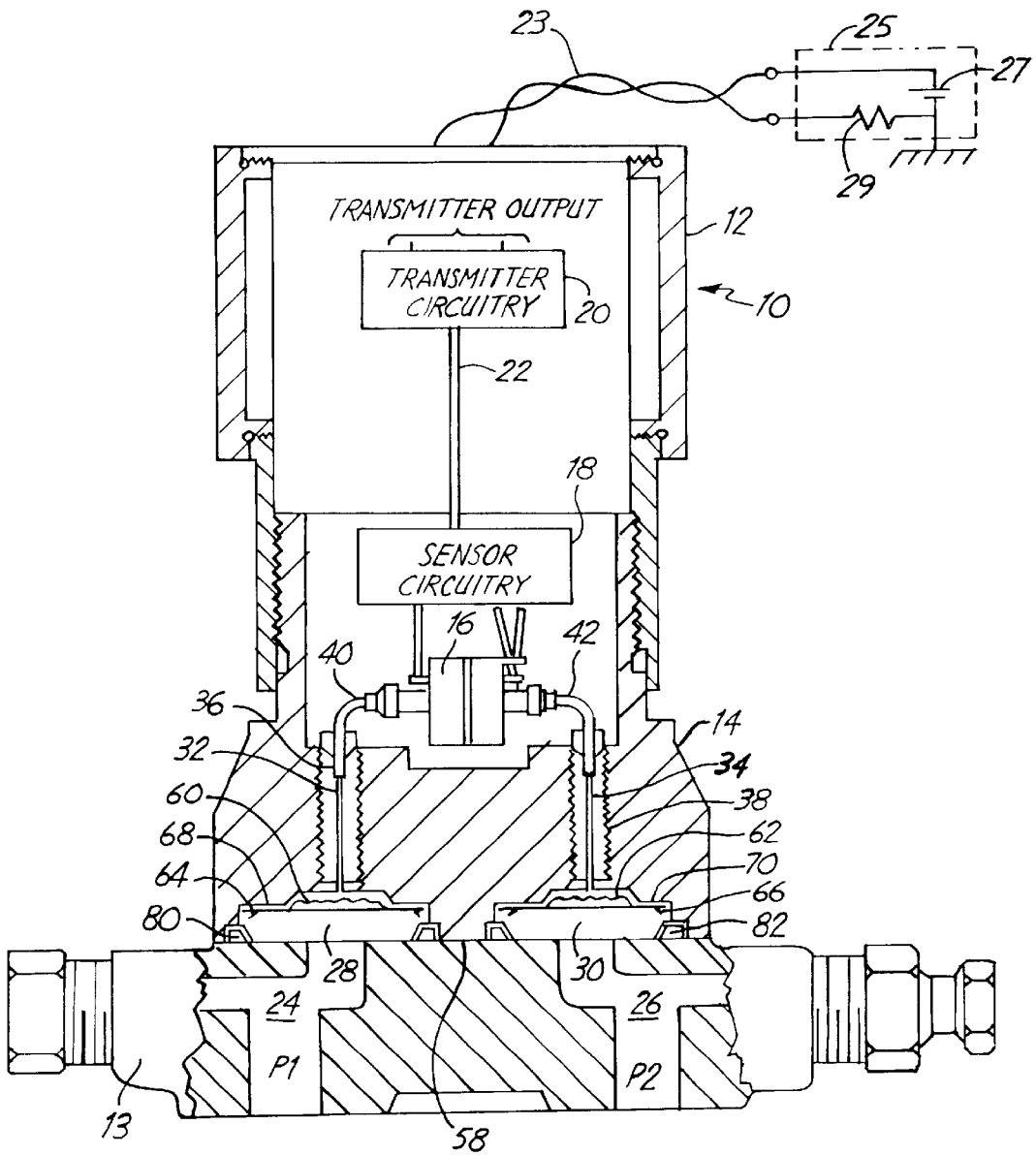
FIG. 1 is a cross-sectional fragmentary view of a pressure transmitter having a weld and a process fluid seal configured in accordance with one embodiment of the invention.

FIG. 1 shows pressure transmitter 10 having transmitter body 12 coupled to flange (or coplanar manifold) 13 through sensor housing 14 in accordance with the present invention. Although the present invention is shown with a Coplanar™ type process flange, the invention can be used with any type of flange, manifold, or other coupling adapted to receive process fluid. Sensor housing 14 includes pressure sensor 16, and transmitter body 12 includes transmitter circuitry 20. Sensor circuitry 18 is coupled to transmitter circuitry 20 through communication bus 22.

Transmitter circuitry 20 sends information related to pressure of the process fluid over a process control loop 23 such as 4–20 mA, HART, Fieldbus, Profibus. Transmitter 10 transmits information related to the process fluid pressure to control room 25 or to other devices (not shown) coupled to process control loop 23. Process control room 25 is modeled as power source 27 and resistor 29. Transmitter 10 can be completely powered by power received over loop 23.

Pressure sensor 16 can be an absolute, gage or a differential pressure sensor. In embodiments in which pressure sensor 16 is a differential pressure sensor, sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor housing 14 and provide a long flame-quenching path between the interior of the sensor housing carrying sensor circuitry 18 and process fluid contained in passageways 24 and 26.

Diaphragm recessor 28 and 30 are formed in the lower portion of housing 14 and couple to passageways 24 and 26. Isolation diaphragms 60 and 62 are welded in the recesses 28 and 30 by welds 64 and 66 to recess faces 68 and 70, respectively. In accordance with the invention, process seals 80 and 82 seal housing 14 to flange 13 and are physically separated from welds 64 and 66.

Flange 13 is mounted onto face 58 of housing 14 by, for example, bolts or other means. This mount causes a mounting force to be applied to housing 14 which causes stress in the housing 14. The stress tends to be concentrated in the vicinity of seals 80 and 82. In prior art designs, the welds 64 and 66 were typically located near the seals 80 and 82. This caused the mounting stress to be transferred directly to the isolation diaphragms. The mounting stress can cause pressure to be applied to the fill fluid carried in capillary tubes 32 and 34. This applied pressure can result in errors in the pressure measurements.

With this present invention, the physical space between the seals 80, 82 and the welds 64, 66 reduces the stress transferred from the seal to the weld and diaphragms 60, 62. Additionally, any mounting stress in housing 14 tends to be concentrated near the outer surfaces of housing 14 and in particular around face 58. However, because the diaphragms 60, 62 are spaced apart from face 58, stress is also reduced.

Figure 2:
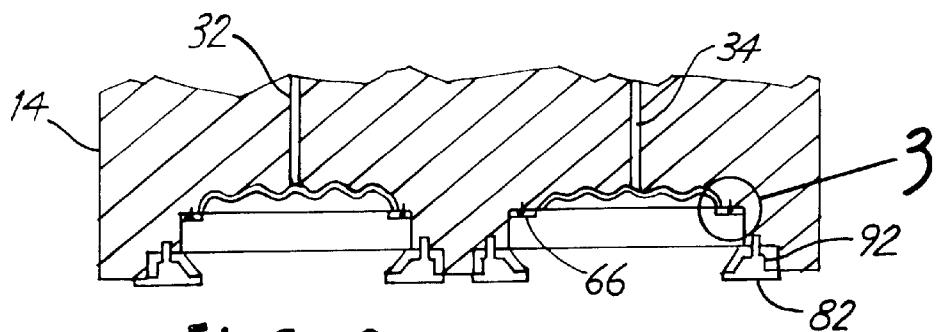
FIG. 2 is an enlarged cross-sectional view of a portion of the transmitter of FIG. 1.
Figure 3:
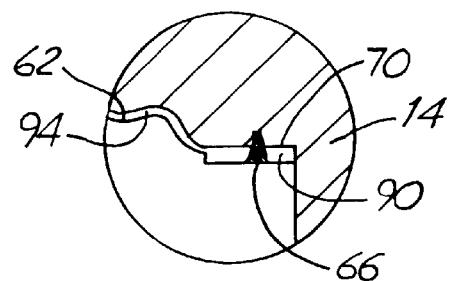
FIG. 3 is an inset of a diaphragm weld shown in FIG. 2.

FIG. 2 is a more detailed cross-sectional view of housing 14 and FIG. 3 is a cross-sectional inset taken from FIG. 2 which illustrates one embodiment of the present invention. As shown in FIG. 3, an optional weld ring 90 extends around diaphragm 62. An optional seal weld ring 92 carries seal 82 (see FIG. 2). The inset of FIG. 3 also shows weld 66 extending through weld ring 90 and diaphragm 62 and into housing 14. A small gap 94 between diaphragm 62 and housing 14 is filled with the isolation/fill fluid discussed above.

Figure 4:
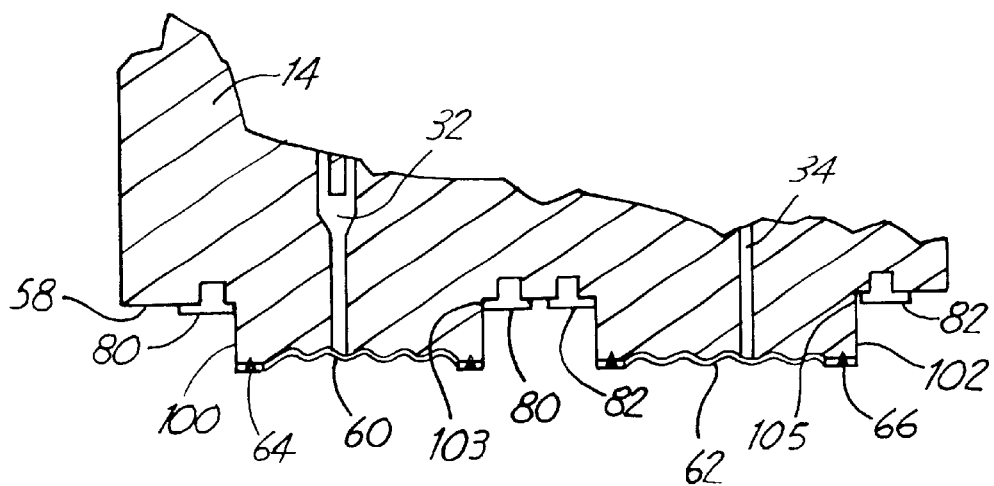
FIG. 4 is a fragmentary cross-sectional view of another embodiment of the invention in which the diaphragms are carried on plateaus.

FIG. 4 is a fragmentary cross-sectional view of another embodiment of body 14 in which the diaphragms 60, 62 are carried on plateaus 100 and 102, respectively, relative to face 58. The plateaus 100, 102 can be formed by machining or by attaching separate pieces. Seals 80 and 82 extend around the bases 103, 105 of plateaus 100 and 102, respectively. As in the embodiments of FIGS. 1–3, in the embodiment of FIG. 4 a spacing between the diaphragm welds 64, 66 enhance the diaphragms 60, 62, relative to seals 80 and 82 and reduces the stress from mounting which is applied to the diaphragms and thereby reduces measurement errors. Further, because the diaphragms 60, 62 are positioned at a location which is subject to less deformation due to mounting stress, the diaphragms will be subjected to less stress and therefore be capable of producing more accurate measurements.

Although the present invention has been shown with respect to a differential pressure sensor of a particular style, the invention is not limited to this configuration. In general, the invention includes the use of diaphragm welds or other types of connection which are spaced apart from the location of the process seal. The various welds can be any type of weld including laser and TIG welds. The seal can be an O-ring including a gasket or other type of seal. The invention can be used with any device or in any configuration in which isolation diaphragms are employed. The invention is not limited to differential pressure sensing as shown in the Figures. Further, the invention can be used with passive devices such as remote seals in which the electronics and sensor circuitry are spaced apart from the diaphragms.

FIG. 5 is a graph of span error in percent versus torque in·lb for a single bolt used to seal a flange to the body 14 illustrated in FIG. 4 in comparison to a typical prior art configuration. The inventive configuration exhibits a factor 10 improvement over prior art designs in zero and span errors versus torque.

Figure 6A:
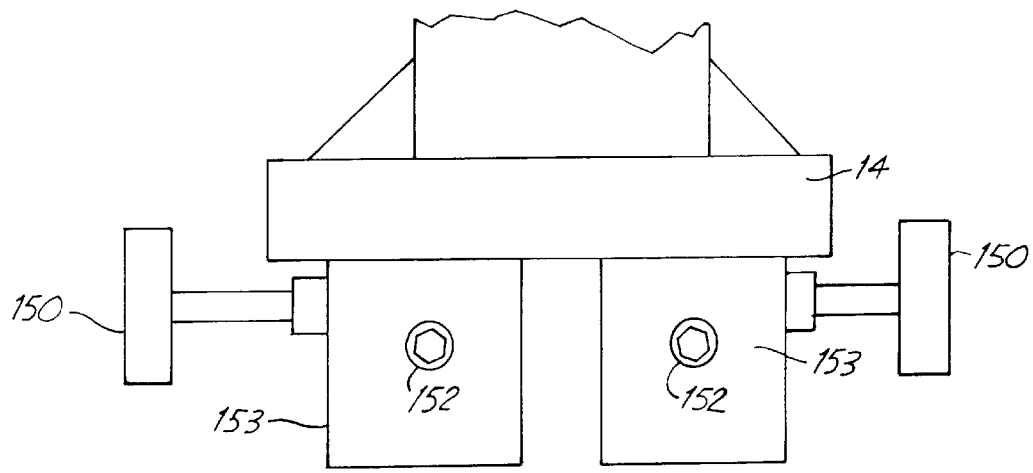
FIG. 6A is a side plan view and FIG. 6B is a bottom plan view of an embodiment of the present invention which includes plateaus having vent and block valves carried therein.
Figure 6B:
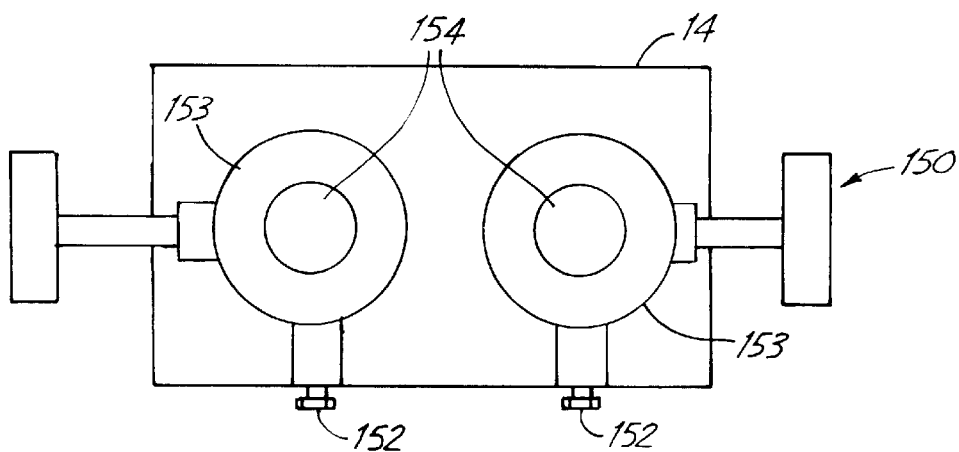

FIG. 6A is a side plan view and FIG. 6B is a bottom plan view of another embodiment in which plateaus 153 include optional shut off valves 150 and vent valves 152 which may be used alone or in combination. With this embodiment, it is possible to block or vent process fluid without the use of an additional manifold. In such an embodiment, block valve 150 include members which are configured block a bore 154 which extend through plateaus 153. Similarly, vent valves 152 are configured to provide a vent for bores 154. In such an embodiment, the isolation diaphragms must be recessed within bores 154. Bores 154 can be threaded to receive standard threaded piping.

Figure 7A:
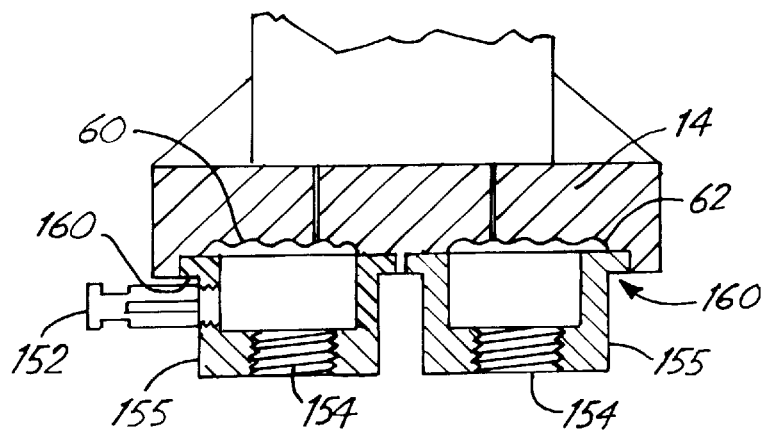
FIG. 7A is a side cross-sectional view showing an embodiment in which plateaus are welded to the transmitter body.
Figure 7B:
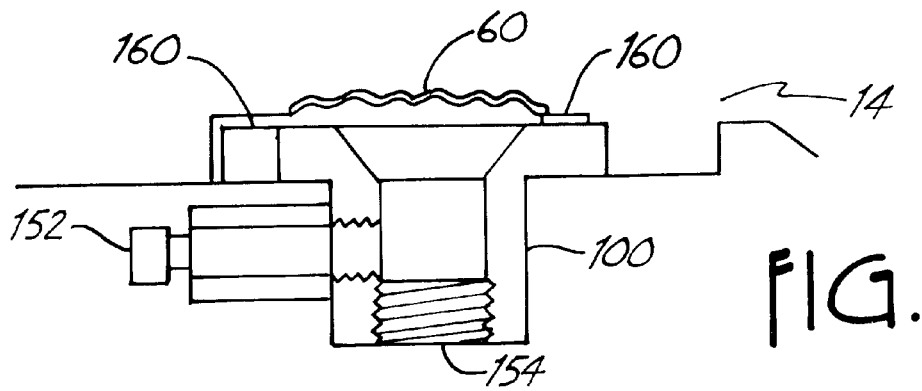
FIG. 7B is close-up cross-sectional view showing a weld of FIG. 7A.

FIG. 7A is a side cross-sectional view and FIG. 7B is close-up cross-sectional view of another embodiment similar to FIGS. 6A and 6B in which plateaus 155 are welded at welds 160 to body 14.

Figure 7C:
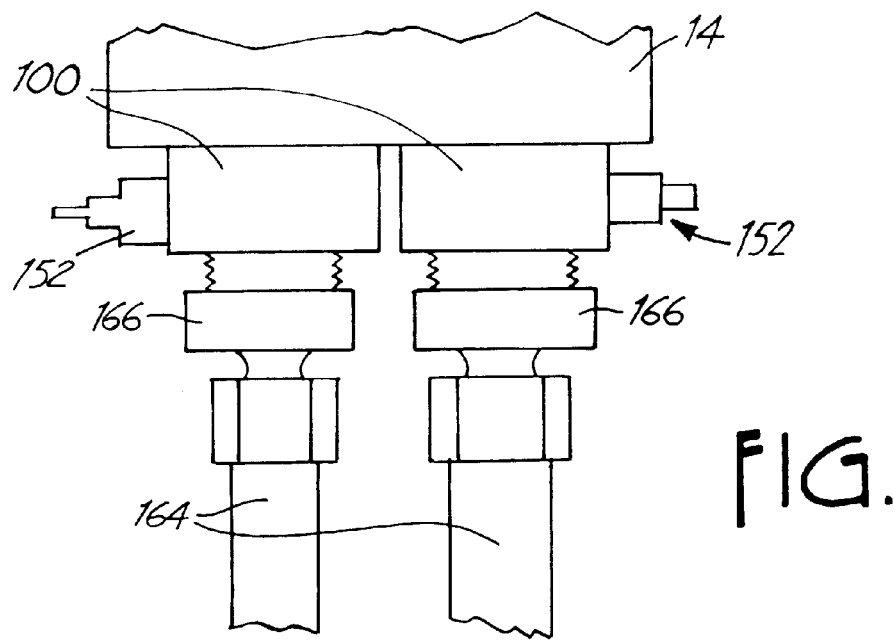
FIG. 7C is a side plan view showing plateaus coupled to impulse tubes.

FIG. 7C is a side plan view of the embodiment of FIG. 7A in which plateaus 155 are coupled to impulse tubes 164 through threaded fittings 166. Impulse tubes 164 provide a coupling to the process fluid. However, techniques other than impulse piping can be used to couple to the process.

Figure 8:
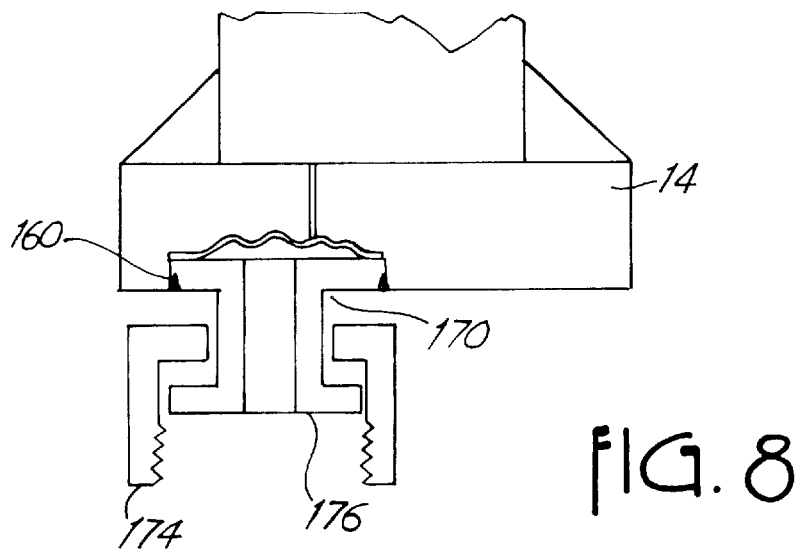
FIG. 8 is a side cross-sectional view showing a raised coupling.

FIG. 8 shows an embodiment in which a raised coupling 170 couples to body 14. In these embodiments, the mounting can be a weld, threaded or other mount. A sealing surface 176 is provided within a coupling 174 to couple to process piping.

Although the present invention has been described with reference to preferred embodiments, workers skilled in the art will recognize that changes may be made in form and detail without departing from the spirit and scope of the invention. Although the Figures illustrate transmitters with two process couplings, the invention includes transmitters with any number of couplings including a single coupling. The plateau or recess of the invention provides a spacing between the process fluid seal and the diaphragm weld to reduce stress arising from a mounting force.

What is claimed is:

1. A process transmitter for measuring a process pressure, comprising:

a pressure sensor;

a sensor housing having a face configured to be exposed to process fluid, the face includes a face step;

a fill fluid capillary tube which couples fluid from the pressure sensor to the face;

an isolation diaphragm which isolates fill fluid in the capillary tube from the process fluid;

a diaphragm weld which attaches the isolation diaphragm to the face step offset from a plane of the diaphragm; and a process fluid seal which seals a process fluid connection to the face of the sensor housing to thereby couple process fluid to the isolation diaphragm, the process fluid seal spaced apart in a direction perpendicular to a plane of the face from the diaphragm weld to reduce stress on the diaphragm from the process fluid seal due to a mounting force.

2. The apparatus of claim 1 including a plateau on the sensor housing face and wherein the diaphragm and weld are carried on the plateau.

3. The apparatus of claim 1 wherein the seal extends around a base of the plateau.

4. The apparatus of claim 1 including a weld ring which extends around the isolation diaphragm and wherein the diaphragm weld extends through the weld ring.

5. The apparatus of claim 1 including a weld ring which extends around the seal to couple the seal to the sensor housing body.

6. The apparatus of claim 1 wherein the seal comprises a O-ring.

7. The apparatus of claim 1 wherein the face includes a recess and the isolation diaphragm and weld are disposed in the recess.

8. The apparatus of claim 7 wherein the seal extends around an opening to the recess.

9. The apparatus of claim 1 including a second isolation diaphragm and a second weld spaced apart from the face, and a second process fluid seal, the transmitter configured to measure a differential pressure.

10. The apparatus of claim 1 wherein the process fluid seal is positioned within a second step in the face.

11. A process transmitter for measuring a process pressure, comprising:

a pressure sensor;

a sensor housing having a face configured to be exposed to process fluid, the face including a mounting portion adapted for mounting the face to a process fluid connection;

a fill fluid capillary tube which couples the pressure sensor to the face;

an isolation diaphragm which isolates fill fluid in the capillary tube from the process fluid;

a diaphragm weld which attaches the isolation diaphragm to a step in the face of the sensor housing which is offset from a plane of the diaphragm;

a process fluid seal disposed adjacent the mounting portion of the face which seals a process fluid connection to the face of the sensor housing to thereby couple process fluid to the isolation diaphragm; and wherein the diaphragm and weld are spaced apart from the mounting portion of the face in a direction perpendicular to a plane of the face to thereby reduce stress on the diaphragm from the face due to a mounting force.

12. The apparatus of claim 11 including a plateau on the sensor housing face and wherein the diaphragm and weld are carried on the plateau.

13. The apparatus of claim 11 wherein the seal extends around a base of the plateau.

14. The apparatus of claim 11 including a weld ring which extends around the isolation diaphragm and wherein the diaphragm weld extends through the weld ring.

15. The apparatus of claim 11 including a weld ring which extends around the seal to couple the seal to the sensor housing.

16. The apparatus of claim 11 wherein the seal comprises a O-ring.

17. The apparatus of claim 11 wherein the face includes a recess and the isolation diaphragm and weld are disposed in the recess.

18. The apparatus of claim 17 wherein the seal extends around an opening to the recess.

19. The apparatus of claim 11 wherein the process fluid seal is positioned within a second step in the face.

20. A method of coupling a process pressure to a pressure sensor in a process transmitter, comprising:

attaching an isolation diaphragm to a step on a face of the process transmitter wherein the step is offset from a plane of the diaphragm;

providing a seal on the face of the process transmitter to seal to a process flange; and spacing the seal apart from the isolation diaphragm in a direction perpendicular to a plane of the face to reduce deformation of the isolation diaphragm due to mounting stress.

21. The method of claim 20 wherein spacing the seal apart from the isolation diaphragm comprises placing the isolation diaphragm in a recess on the face.

22. The method of claim 20 wherein spacing the seal apart from the isolation diaphragm comprises placing the isolation diaphragm on a plateau on the face.

23. The apparatus of claim 20 wherein the process fluid seal is positioned within a second step in the face.

* * * * *

UNITED STATES PATENT AND TRADEMARK OFFICE
Certificate

Patent No. 6,675,655 B2

Patented: January 13, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David A. Broden, Andover, MN; Debra K. Zeller, Victoria, MN; and Chad M. McGuire, Minneapolis, MN.

Signed and Sealed this Twenty-eighth Day of December 2004.

ANDREW H. HIRSHFELD
*Supervisory Patent Examiner*
Art Unit 2854